(12) United States Patent
Noda et al.

(10) Patent No.: US 6,808,795 B2
(45) Date of Patent: Oct. 26, 2004

(54) POLYHYDROXYALKANOATE COPOLYMER AND POLYLACTIC ACID POLYMER COMPOSITIONS FOR LAMINATES AND FILMS

(75) Inventors: Isao Noda, Fairfield, OH (US); Eric Bryan Bond, Maineville, OH (US); David Harry Melik, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 33 days.

(21) Appl. No.: 10/051,724

(22) Filed: Jan. 17, 2002

(65) Prior Publication Data

US 2002/0143136 A1 Oct. 3, 2002

Related U.S. Application Data

(60) Provisional application No. 60/278,948, filed on Mar. 27, 2001.

(51) Int. Cl.[7] .............................. B32B 7/02; C08F 20/00
(52) U.S. Cl. .................... 428/221; 428/297.4; 428/480; 524/424; 525/437; 525/450; 528/354; 528/361
(58) Field of Search .......................... 528/361; 525/437, 525/450; 428/35.7, 221, 297.4; 524/424

(56) References Cited

U.S. PATENT DOCUMENTS

| | | |
|---|---|---|
| 5,489,470 A | 2/1996 | Noda |
| 5,498,692 A | 3/1996 | Noda |
| 5,502,116 A | 3/1996 | Noda |
| 5,536,564 A | 7/1996 | Noda |
| 5,602,227 A | 2/1997 | Noda |
| 5,618,855 A | 4/1997 | Noda |
| 5,653,930 A | 8/1997 | Noda et al. |
| 5,685,756 A | 11/1997 | Noda |
| 5,747,584 A | 5/1998 | Noda |
| 5,780,368 A | 7/1998 | Noda |
| 5,800,758 A | 9/1998 | Topolkaraev et al. |
| 5,821,299 A | 10/1998 | Noda et al. |
| 5,849,854 A | 12/1998 | Noda |
| 5,914,184 A | 6/1999 | Morman |
| 5,932,497 A | 8/1999 | Morman et al. |
| 5,955,187 A | 9/1999 | McCormack et al. |
| 5,968,643 A | 10/1999 | Topolkaraev et al. |
| 5,990,271 A | 11/1999 | Noda |
| 6,002,064 A | 12/1999 | Kobylivker et al. |
| 6,013,590 A | 1/2000 | Noda |
| 6,015,764 A | 1/2000 | McCormack et al. |
| RE36,548 E | 2/2000 | Noda |
| 6,027,787 A | 2/2000 | Noda |
| 6,077,931 A | 6/2000 | Noda |
| 6,143,947 A | 11/2000 | Noda |
| 6,160,199 A | 12/2000 | Noda |
| 6,174,990 B1 | 1/2001 | Noda |

FOREIGN PATENT DOCUMENTS

| | | |
|---|---|---|
| EP | 0753539 A1 | 1/1997 |
| EP | 0993832 A1 | 4/2000 |
| JP | 10147653 | 6/1998 |
| JP | 11269754 A | 10/1999 |
| WO | WO 95/20615 A1 | 8/1995 |
| WO | WO 96/08535 A1 | 3/1996 |
| WO | WO 98/28134 | 7/1998 |
| WO | WO 98/28135 | 7/1998 |
| WO | WO 98/29246 | 7/1998 |
| WO | WO 98/29247 | 7/1998 |
| WO | WO 98/29481 | 7/1998 |
| WO | WO 98/44025 | 10/1998 |
| WO | WO 98/51474 | 11/1998 |
| WO | WO 99/12734 | 3/1999 |
| WO | WO 99/14047 | 3/1999 |
| WO | WO 99/14262 | 3/1999 |
| WO | WO 99/14263 | 3/1999 |
| WO | WO 99/23139 | 5/1999 |
| WO | WO 99/23140 | 5/1999 |
| WO | WO 99/32272 | 7/1999 |
| WO | WO 99/67095 | 12/1999 |
| WO | WO 02/46277 A1 | 6/2002 |

*Primary Examiner*—Samuel A. Acquah
(74) *Attorney, Agent, or Firm*—Julie A. McConihay; Angela Marie Stone; Leonard M. Lewis

(57) ABSTRACT

Environmentally degradable films comprising a blend of polyhydroxyalkanoate copolymer and a polylactic acid polymer or copolymer are disclosed. Laminates having a first layer comprising a PHA copolymer and a second layer comprising a PLA polymer or copolymer are also disclosed. Disposable articles comprising the environmentally degradable films or laminates are also disclosed.

15 Claims, No Drawings

US 6,808,795 B2

POLYHYDROXYALKANOATE COPOLYMER AND POLYLACTIC ACID POLYMER COMPOSITIONS FOR LAMINATES AND FILMS

The present application claims benefit of U.S. Ser. No. 60/278,948, filed Mar. 27, 2001.

FIELD OF THE INVENTION

The present invention relates to environmentally degradable films comprising a polyhydroxyalkanoate copolymer (PHA)/polylactic acid polymer or copolymer (PLA) blend. Laminates having a first layer comprising a PHA copolymer and a second layer comprising a PLA polymer or copolymer are also disclosed. The films or laminates are used to make disposable articles.

BACKGROUND OF THE INVENTION

This invention relates to the need for alleviating the growing environmental problem of excessive plastic waste that makes up an increasing volume fraction of materials in landfills. Biodegradable polymers and products formed from biodegradable polymers are becoming increasingly important in view of the desire to reduce the volume of solid waste materials generated by consumers each year. The invention further relates to the need for developing new plastic materials that can be used in applications where biodegradability, compostability or biocompatibility are among primary desirable features of such applications. There have been many attempts to make degradable articles. However, because of costs, the difficulty in processing, and end-use properties, there has been little commercial success. Many compositions that have excellent degradability have only limited processability. Conversely, compositions which are more easily processable have reduced degradability.

A conventional disposable absorbent product is already to a large extent compostable. A typical disposable diaper, for example, consists of about 80% of compostable materials, e.g., wood pulp fibers, and the like. Nevertheless, there is a particular need to replace polyethylene backsheets in absorbent articles with liquid impervious films of compostable material, because the backsheet is typically one of the largest non-compostable components of a conventional disposable absorbent article.

To produce films that have more acceptable end-use properties, choosing acceptable degradable polymers is challenging. The degradable polymers should be thermoplastic such that conventional film processing methods can be employed, including running on converting lines. Further, it is important that the film or large film fragments undergo an initial breakup to much smaller particles during the initial stages of composting.

In addition, there has been an emerging interest in the breathability of disposable hygiene products to minimize the discomfort associated with the accumulation of high humidity. Breathable films that can contain liquid while allowing some passage of moisture vapor are of special interest in constructing such products. Controlling the pore size is achieved by dispersing filler particles uniformly and very finely within the film matrix before a stretching operation. Materials such as polyolefin have such a low affinity to filler surface that it is difficult to obtain a good dispersion of particles. Polyesters have a better affinity to many solid surfaces so that particles tend to spread more easily, however, if the interaction is too strong, the desired mechanical failure at the interface between the filler and film matrix to create pores during the stretching will not occur. Materials with a moderate level of interaction with fillers are needed for breathable films. Further, such materials must be substantially ductile to prevent macroscopic mechanical failure leading to large tears during the stretching. For example, typical aromatic polyesters such as polyethylene terephthalate are too brittle to contain the localized mechanical failure around the individual filler particles.

Polyhydroxyalkanoates (PHAs) are generally semicrystalline, thermoplastic polyester compounds that can either be produced by synthetic methods or by a variety of microorganisms, such as bacteria or algae. The latter typically produce optically pure materials. Traditionally known bacterial PHAs include isotactic poly(3-hydroxybutyrate), or PHB, the high-melting, highly crystalline, very fragile/brittle, homopolymer of hydroxybutyric acid, and isotactic poly(3-hydroxybutyrate-co-valerate), or PHBV, the somewhat lower crystallinity and lower melting copolymer that nonetheless suffers the same drawbacks of high crystallinity and fragility/brittleness. PHBV copolymers are described in Holmes, et al. U.S. Pat. Nos. 4,393,167 and 4,477,654; and until recently were commercially available from Monsanto under the trade name BIOPOL. Their ability to biodegrade readily in the presence of microorganisms has been demonstrated in numerous instances. Due to the slow crystallization rate, a film made from PHBV will stick to itself even after cooling; a substantial fraction of the PHBV remains amorphous and tacky for long periods of time. In both cast film operations and in blown films, residual tack limits processing.

Other known PHAs are the so-called medium to long side-chain PHAs, such as isotactic polyhydroxyoctanoates (PHOs). These, unlike PHB or PHBV, are virtually amorphous owing to the recurring pentyl and higher alkyl side-chains that are regularly spaced along the backbone. When present, their crystalline fraction however has a very low melting point as well as an extremely slow crystallization rate. For example, Gagnon, et al. in Macromolecules, 25, 3723–3728 (1992), incorporated herein by reference, show that the melting temperature is around 61° C. and that it takes about 3 weeks to reach the maximum extent of crystallization at its optimal crystallization temperature.

Further poly(3-hydroxyalkanoate) copolymer compositions have been disclosed by Kaneka (U.S. Pat. No. 5,292, 860) and Procter & Gamble (U.S. Pat. Nos. 5,498,692; 5,536,564; 5,602,227; 5,685,756). All describe various approaches of tailoring the crystallinity and melting point of PHAs to any desirable lower value than in the high-crystallinity PHB or PHBV by randomly incorporating controlled amounts of "defects" along the backbone that partially impede the crystallization process. Such "defects" are either branches of different types (3-hydroxyhexanoate and higher) or shorter (3HP, 3hydroxypropionate) or longer (4HB, 4-hydroxybutyrate) linear aliphatic flexible spacers. The results are semicrystalline copolymer structures that can be tailored to melt in the typical use range between 80° C. and 150° C. and that are less susceptible to thermal degradation during processing. In addition, the biodegradation rate of these copolymers is higher as a result of their lower crystallinity and the greater susceptibility to microorganisms. Yet, whereas the mechanical properties and melt handling conditions of such copolymers are generally improved over that of PHB or PHBV, their rate of crystallization is characteristically slow, often slower than PHB and PHBV.

In general, however, it has been a considerable challenge to convert these newer PHA copolymers, as well as other biodegradable polymers, into useful forms by conventional melt methods. The polymers remain substantially tacky after they are cooled down from the melt and remain as such until sufficient crystallinity sets in, particularly with PHA copolymers with noncrystallizing component levels above 10 wt %. Residual tack typically can lead to material sticking to itself or to the processing equipment, or both, and thereby can restrict the speed at which a polymeric product is produced or prevent the product from being collected in a form of suitable quality. Consequently, there is a need for an inexpensive and melt processable composition of degradable polymers. Moreover, the polymer composition should be suitable for use in conventional processing equipment. There is also a need for disposable articles made from these films. For breathable film fabrication, there is a need to develop environmentally degradable materials that have a moderate affinity for solid filler surfaces for good particle dispersion and that are soft and ductile to have only localized mechanical failure to create fine pores upon stretching.

SUMMARY OF THE INVENTION

Environmentally degradable melt processed blended films comprising a polyhydroxyalkanoate copolymer (PHA) and a polylactic acid polymer or copolymer (PLA) are disclosed. Laminates comprising a first layer comprising a PHA copolymer as described herein and a second layer comprising a PLA polymer or copolymer as described herein are also disclosed. Such blended compositions or laminates generally provide material properties different and improved in any one or more properties as compared to PHA copolymers alone or to PLA polymers or copolymers alone. Properties in which the blended materials or laminates are different and improved are any one of hardness/softness, brittleness/flexibility, tack, stickiness, toughness, ductility, processability, opaqueness/transparency, or breathability, for example. Further, breathable films comprising PHA with particulate fillers are disclosed. Disposable articles comprising the environmentally degradable films are also disclosed.

DETAILED DESCRIPTION OF THE INVENTION

Copolymer compositions used herein are in mole percent. All other percentages, ratios and proportions used herein are by weight percent of the composition, unless otherwise specified.

The specification contains a detailed description of (1) materials of the present invention, (2) film or laminate properties, (3) method of film or laminate manufacture, and (4) disposable products.

The present invention is directed toward films or laminates comprising environmentally degradable polymers. A first polymer is biodegradable and is a polyhydroxyalkanoate copolymer as set forth infra. A second polymer is an environmentally degradable PLA polymer as set forth infra. The polyhydroxyalkanoate copolymer will make the film or laminate rapidly environmentally degradable. The second PLA polymer will make the polymer blend processable and help to decrease stickiness that is commonly associated with polyhydroxyalkanoate polymers.

The present invention is also direct toward breathable films comprising environmentally degradable polymers. A polhydroxyalkanoate copolymer as set forth infra and a particulate filler. An environmentally degradable PLA polymer may also be included in the breathable film.

(1) Materials

Polyhydroxyalkanoate Copolymers (PHAs)

The biodegradable films or laminates are formed in part from a composition comprising at least a first biodegradable polyhydroxyalkanoate copolymer comprising at least two randomly repeating monomer units (RRMUs). The first RRMU has the structure (I):

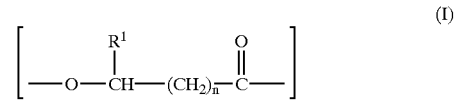

wherein $R^1$ is H, or C1 or C2 alkyl, and n is 1 or 2. In a preferred embodiment, R1 is a methyl group ($CH_3$). In a further preferred embodiment of the first RRMU, R1 is methyl and n is 1, whereby the polyhydroxyalkanoate copolymer comprises 3-hydroxybutyrate units.

The second RRMU included in the biodegradable polyhydroxyalkanoate copolymer comprises at least one monomer selected from the group consisting of the structures (II) and (III):

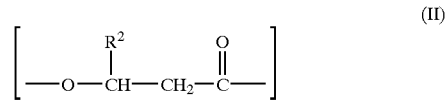

wherein $R^2$ is a C3–C19 alkyl or C3–C19 alkenyl, and

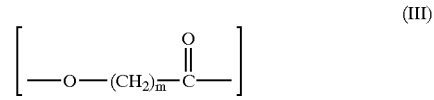

wherein m is from 2 to about 9. Generally, in the RRMU of formula (II), the length of $R^2$ will, to some extent, influence the reduction in overall crystallinity of the copolymer. In a preferred embodiment, $R^2$ is a C3–C15 alkyl group or alkenyl group. In a further preferred embodiment, $R^2$ is a C3–C9 alkyl group, and in a further preferred embodiment, $R^2$ is a C5 or C7 alkyl group. In alternately preferred embodiments, $R^2$ is a C15–C19 alkyl or alkenyl group. Preferably m is from 2 to 5, more preferably m is 3. Additionally, in the RRMU of formula (II), the length of $(CH_2)_m$ will generally, to some extent, influence the reduction in overall crystallinity of the copolymer. In a preferred embodiment, m is from 2 to 9, and more preferably is from 2 to 5. In a further preferred embodiment, m is 3.

Preferably, to obtain the advantageous combination of physical properties exhibited by the films when using the polyhydroxyalkanoate composition, at least about 50 mole percent of the copolymer comprise RRMUs having the structure of the first RRMU of formula (I). Suitably, the molar ratio of the first RRMUs to the second RRMU in the copolymer is in the range of from about 50:50 to about 98:2. More preferably, the molar ratio is in the range of from about 75:20 to about 95:5, and even more preferred, the mole ratio is in the range of from about 80:20 to about 90:10. In addition, the polyhydroxyalkanoate copolymer suitably has a number average molecular weight of greater than about 150,000 g/mole, and further having a melting point designated Tm 1.

In further embodiments of the first polyhydroxyalkanoate copolymer employed in the compositions of the complex film, one or more additional RRMUs may be included. Suitably, the additional RRMUs may have the structure (IV):

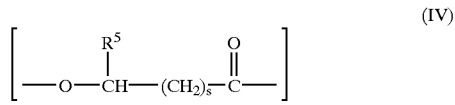

(IV)

wherein $R^5$ is H, or a C1–C19 alkyl or alkenyl group and s is 1 or 2, with the provision that the additional RRMUs are not the same as the first or second RRMUs.

In further preferred embodiments, the polyhydroxyalkanoate composition further comprises a second biodegradable polyhydroxyalkanoate homo- or copolymer, or blend thereof. A preferred second PHA polymer or copolymer comprises at least one randomly repeating monomer unit having the structure (V):

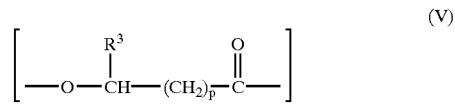

(V)

wherein $R^3$ is H, or C1 or C2 alkyl, and p is 1 or 2. In a preferred embodiment, $R^3$ is a methyl group ($CH_3$). In a further preferred embodiment, $R^3$ is methyl and p is 1, whereby the second polyhydroxyalkanoate polymer comprises 3-hydroxybutyrate units. In a further preferred embodiment, the second polyhydroxyalkanoate polymer is the polyhydroxybutyrate homopolymer. Optionally, the second environmentally degradable polymer comprises two or more additional randomly repeating monomer units selected from the group consisting of the structures (VI) and (VII):

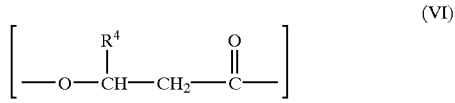

(VI)

wherein $R^4$ is a C2–C19 alkyl or C2–C19 alkenyl, and

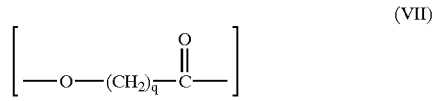

(VII)

wherein q is from 2 to about 16. With reference to the second RRMU comprising a monomer of structure (VII), in a preferred embodiment, q is from 2 to about 10, and more preferably is from about 4 to about 8. In a further preferred embodiment, q is about 5. When present, the additional randomly repeating monomer units represent no more than 25% of the total monomer units, preferably less than 15%, wherein the second polyhydroxyalkanoate homo- or copolymer suitably has a number average molecular weight of greater than about 50,000 g/mole. Further, the second biodegradable polyhydroxyalkanoate has a melting point Tm2 which is at least about 20° C. greater than the melting point, Tm1, of the first biodegradable polyhydroxyalkanoate, so that the equation Tm 2>Tm 1+20° C. is satisfied. The value of the melting point is generally determined by DSC (Differential Scanning Calorimetry) and is taken as the highest endothermic peak temperature observed on the DSC heating scan using, for example, the method outlined in ASTM D 3418. Although not intending to be bound by theory, it is believed that the second biodegradable polyhydroxyalkanoate can act as a nucleating agent for the first biodegradable polyhydroxyalkanoate and thereby improve the crystallization rate of the first biodegradable polyhydroxyalkanoate if the adequate blend composition, structure and high level of dispersion is achieved.

If the second polyhydroxyalkanaote copolymer is used as described above, a majority of the PHA composition comprises the first biodegradable polyhydroxyalkanoate copolymer, whereby the second biodegradable PHA is finely dispersed throughout a continuous phase or matrix of the first copolymer and is included in an amount sufficient to improve the crystallization rate and/or physical properties of the first copolymer. In one embodiment, compositions comprise from about 0.01 to about 10 weight percent of the second PHA copolymer, based on the total weight of the first and second PHA copolymers. In more specific embodiments, the compositions comprise from about 0.1 to about 5 weight percent of the second PHA. In even more specific embodiments, the compositions comprise from about 0.1 to about 3 weight percent of the second PHA copolymer.

The biodegradable polyhydroxyalkanoate copolymers can be synthesized by chemical or biological methods as disclosed, for example, by Noda in U.S. Pat. No. 5,618,855, and Noda, et al. in U.S. Pat. No. 5,942,597, both of which are incorporated herein by reference.

The copolymer may be present as a continuous phase in the composition. The compositions may include a combination of polyhydroxyalkanoate copolymers, or a combination with other polymeric components, for example additional polyester components or the like.

PHA copolymers have excellent affinity to solid particle surfaces thereby allowing for straightforward dispersion of such particles during a stretching step in producing breathable films. PHA copolymers can be stretched without macroscopic tear.

Typically, polyhydroxyalkanoate copolymers are present in blends in an amount of from 5% to 95%, or 10% to 90%, preferably from 10% to 80%, more preferably from 30% to 70%, and most preferably from 40% to 60%, by weight of the film.

Environmentally Degradable Thermoplastic PLA Polymers or Copolymers

Environmentally degradable thermoplastic PLA polymers or copolymers that are substantially compatible with PHA may also be used in the present invention. As used herein, the term "substantially compatible" means when heated to a temperature above the softening and/or the melting temperature of the composition, the polymer is capable of forming a substantially homogeneous mixture with the PHA after mixing with shear or extension. The PLA polymer or copolymer used must be able to flow upon heating to form a processable melt and resolidify as a result of crystallization or vitrification.

The PLA polymer or copolymer must have a melting temperature sufficiently low for processability and yet be sufficiently high for thermal stability during use of the film. Suitable melting temperatures are from about 80° to about 190° C. and preferably from about 90° to about 180° C. Preferred is a homopolymer or copolymer of polylactic acid having a melting temperature from about 160° to about 175° C. The polymer must have theological characteristics suitable for film processing.

The environmentally degradable thermoplastic PLA polymers must be able to solidify fairly rapidly, preferably under extensional flow, and form a thermally stable film structure, as typically encountered in known processes as cast or blown film extrusion methods.

The environmentally degradable PLA polymers suitable for use herein are those materials which are susceptible to being hydrolytically degradable, the hydrolytic products being assimilated by microorganisms such as molds, fungi, or bacteria when the material is buried in the ground or otherwise comes in contact with the microorganisms including contact under aqueous or saline environmental conditions conducive to the growth of the microorganisms. Suitable PLA polymers also include those materials where hydrolytic products are degradable using aerobic or anaerobic digestion procedures, or by virtue of being exposed to environmental elements such as sunlight, rain, moisture, wind, temperature, or the like. The PLA polymers can be used individually or as a combination of polymers provided that the polymers are degradable by biological and/or environmental means.

Specific examples of preferred lactic acid polymers or lactide polymers suitable for use herein include, but are not limited to, those polylactic acid-based polymers or polylactide-based polymers that are generally referred to in the industry as "PLA". Therefore, the terms "polylactic acid", "polylactide" and "PLA" are used interchangeably to include homopolymers or copolymers of lactic acid or lactide based on polymer characterization of the polymers being formed from a specific monomer or the polymers being comprised of the smallest repeating monomer units. It should be understood, however, that the terms "polylactic acid", "polylactide", and "PLA" are not intended to be limiting with respect to the manner in which the polymer is formed.

The polylactic acid or polylactide polymers generally have a lactic acid residue repeating monomer unit that conforms to the following formula

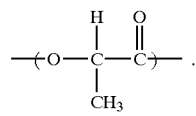

Typically, polymerization of lactic acid or lactide will result in polymers comprising at least about 50% by weight of lactic acid residue repeating units, lactide residue repeating units, or combinations thereof. These lactic acid and lactide polymers include homopolymers and copolymers such as random and/or block copolymers of lactic acid and/or lactide. The lactic acid residue repeating monomer units can be obtained from L-lactic acid, D-lactic acid or D,L-lactic acid, preferably with L-isomer levels up to 75%.

The molecular weight of the degradable polymer must be sufficiently high to enable entanglement between polymer molecules and yet low enough to be melt processed. For melt processing, PLA polymers or copolymers have weight average molecular weights of from 10,000 g/mol to about 600,000 g/mol, preferably below 500,000 g/mol or 400,000 g/mol, more preferably from about 50,000 g/mol to about 300,000 g/mol or 30,000 g/mol to about 400,000 g/mol, and most preferably from about 100,000 g/mol to about 250,000 g/mol, or from 50,000 g/mol to about 200,000 g/mol. An example of commercially available polylactic acid polymers include a variety of polylactic acids that are available from the Chronopol Inc. (Golden, Colo.), or polylactides sold under the tradename EcoPLA®. Further examples of suitable commercially available polylactic acid include NATUREWORKS from Cargill Dow, LACEA from Mitsui Chemical, or a PLA resin L5000 from Biomer. When using PLA, it is preferred that the PLA is in the semi-crystalline form. To form semi-crystalline PLA, it is preferred that at least about 90 mole percent of the repeating units in the polylactide be one of either L- or D-lactide, and even more preferred at least about 95 mole percent. The processing is conducted in such a way that facilitates crystalline formation, for example, using extensive orientation.

Depending upon the specific polymer used, the process, and the final use of the film or laminate, more than one polymer may be desired. For example, if a crystallizable polylactic acid having a melting temperature of from about 160° to about 175° C. is used, a second polylactic acid having a lower melting point and lower crystallinity than the other polylactic acid and/or a higher copolymer level may be used. Alternatively, an aliphatic aromatic polyester may be used with crystallizable polylactic acid.

Typically, the PLA polymer or copolymer is present in blends in an amount of from 5% to 95%, or 10% to 90%, preferably from 10% to 80%, more preferably from 30% to 70%, and most preferably from 40% to 60%, by weight of the film. The PLA polymer or copolymer may be present in an amount of from about 0% to about 50% in a breathable film comprising PHA and a particulate filler.

Further Ingredients

A plasticizer can be used in the present invention. The plasticizers are sufficiently compatible with the polymeric components of the present invention so that the plasticizers may effectively modify the properties of the composition. In general, a plasticizer tends to lower the modulus and tensile strength, and to increase the ultimate tensile elongation, impact strength, and tear strength of the polymeric product. The plasticizer may also be used to lower the melting point of the composition to thereby enable melt-processing at lower temperatures and to minimize energy requirements and thermal degradation. Although, plasticizers are typically not required in order to obtain the advantageous combination of properties discussed above.

Nonlimiting examples of plasticizers include hydroxyl plasticizers, sugar alcohols, polyols, hydrogen bond forming organic compounds which do not have hydroxyl group, including urea and urea derivatives, anhydrides of sugar alcohols, animal proteins, vegetable proteins, organic acid esters which are biodegradable, aliphatic acids, or the like. Further suitable plasticizers are those described in the above referenced U.S. Pat. Nos. 3,182,036 and 5,231,148. The plasticizers may be use alone or in mixtures thereof. Suitable molecular weights are less than about 20,000 g/mol, preferably less than about 5,000 g/mol and more preferably less than about 1,000 g/mol. If present, the amount of plasticizer in the final film composition is from about 2% to about 70%, more preferably from about 5% to about 55%, most preferably from about 10% to about 50%.

Optionally, other ingredients may be incorporated into the composition in quantities of less than about 50%, preferably from about 0.1% to about 20%, and more preferably from about 0.1% to about 12% by weight of the composition. The optional materials may be used to modify the processability and/or to modify physical properties such as elasticity, tensile strength and modulus of the final product. Other benefits include, but are not limited to, stability including oxidative stability, brightness, color, flexibility, resiliency, workability, processing aids, viscosity modifiers, and odor control.

Nonlimiting examples of other optional ingredients include aromatic/aliphatic polyester copolymers made more readily hydrolytically cleavable, and hence more likely biodegradable, such as those described in U.S. Pat. Nos. 5,053,482, 5,097,004, 5,097,005, and 5,295,985, biodegradable aliphatic polyesteramide polymers, polycaprolactones, polyesters or polyurethanes derived from aliphatic polyols (i.e., dialkanoyl polymers), polyamides including polyethylene/vinyl alcohol copolymers, cellulose esters or plasticized derivatives thereof, salts, slip agents, crystallization accelerators such as nucleating agents, crystallization retarders, odor masking agents, cross-linking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, antiblocking agents, antistatic agents, or mixtures thereof. Slip agents may be used to help reduce the tackiness or coefficient of friction in the film. Also, slip agents may be used to improve film stability, particularly in high humidity or temperatures. A suitable slip agent is polyethylene. A salt may also be added to the melt to make the film more water responsive or used as a processing aid. A salt will also function to help reduce the solubility of a binder so it does not dissolve, but when put in water or flushed, the salt will dissolve then enabling the binder to dissolve and create a more aqueous-responsive product.

Fabrication of breathable films includes extensively stretching a film which is loaded with various particulate fillers. Such fillers include numerous types of inorganic or organic solids, such as talc, calcium carbonate, mica, kaolin, plastic beads, latex, or the like. Inorganic fillers further include fillers such as the oxides of magnesium, aluminum, silicon, or titanium; hydrous magnesium silicate, titanium dioxide, clay, dirt, chalk, boron nitride, limestone, diatomaceous earth, glass, quartz, or ceramics. Particulate fillers are typically present in an amount of from about 1% to about 50% based on the particular ingredient and use of the breathable film.

Further examples of other ingredients are known to one of skill in the art in light of the present disclosure.

(2) Film or Laminate Properties

The present invention is in the form of a film or laminate, as described in U.S. Pat. No. 5,498,692, and uses blended or laminated compositions as described herein. As used herein, "blend" means a composition having two or more ingredients (i.e. PHA with PLA or PHA with a particulate filler). As used herein, "film" means an extremely thin continuous piece of a substance having a high length to thickness ratio and a high width to thickness ratio. While there is no requirement for a precise upper limit of thickness, a preferred upper limit would be 0.254 mm, more preferably still about 0.01 mm, more preferably still about 0.005 mm. The protective value of any film depends on its being continuous, i.e., without holes or cracks Breathable films include dispersed particulate filler, the film having been stretched to produce continuous pores that prevent penetration of liquid and that pass moisture vapor. A breathable film may be one layer of a multiplayer film. The film may be a multilayer film, i.e., a laminate or composite. A laminate is defined as two or more films joined together. A laminate may have one or more layers comprising a blended PHA/PLA composition as set forth herein. In another embodiment, a laminate may have a first layer comprising a PHA copolymer as described herein and a second layer comprising a PLA polymer or copolymer as set forth herein. The laminate may have a first layer comprising a PHA copolymer, a second layer comprising a PHA/PLA blend, and a third layer comprising PLA, or any combination of layers desired. As used, the terms first, second, or third layers are simply used to describe separate layers and are not intended to be limiting as to the location of the layer.

The film of the present invention can be employed in a variety of disposable products including, but not limited to, disposable diapers, shrink-wrapping (e.g., food wraps, consumer product wraps, pallet and/or crate wraps, and the like), or bags (grocery bags, food storage bags, sandwich bags, resealable "Ziploc™"-type bags, garbage bags, and the like). In one embodiment of the present invention, the film is a liquid impervious backsheet or a perforated topsheet and is suitable for use in absorbent disposable sanitary garments such as disposable diapers, feminine hygiene products or the like. Films of the present invention, in addition to increased biodegradability and/or compostability, may have properties as set forth in U.S. Pat. No. 5,990,271.

The films or laminates produced in the present invention are environmentally degradable. "Environmentally degradable" is defined as being biodegradable, disintegratable, "aqueous-responsive," dispersible, flushable, or compostable or a combination thereof. In the present invention, the films, multilayer films (laminates) and articles are environmentally degradable. As a result, the films or laminates can be easily and safely disposed of either in existing composting facilities or may be flushable and can be safely flushed down the drain without detrimental consequences to existing sewage infrastructure systems. The environmental degradability of the films or laminates of the present inventions offer a solution to the problem of accumulation of such materials in the environment following their use in disposable articles. The flushability of the films of the present invention when used in disposable products, such as wipes and feminine hygiene items, offer additional convenience and discreteness to the consumer. Although biodegradability, disintegratability, "aqueous-responsiveness," dispersibility, compostability, and flushability all have different criteria and are measured through different tests, generally the films or laminates of the present invention will meet more than one of these criteria.

In general, PLA polymers or copolymers take more time to degrade than PHA copolymers. The PHA copolymer constituent of the present blends will readily degrade by microbial or enzymatic activity thereby forming a porous structure which is more accessible to and which facilitates hydrolytic processing of the PLA constituent followed by biodegradation of PLA hydrolytic products.

Biodegradable is defined as meaning when the matter is exposed to an aerobic and/or anaerobic environment, the ultimate fate is reduction to monomeric components due to microbial, hydrolytic, and/or chemical actions. Under aerobic conditions, biodegradation leads to the transformation of the material to end products such as carbon dioxide and water. Under anaerobic conditions, biodegradation leads to the transformation of the materials to carbon dioxide, water, and methane. The biodegradability process is often described as mineralization. Biodegradability means that all organic constituents of the films are subject to decomposition eventually through biological activity.

A variety of different standardized biodegradability methods have been established by various organizations and in different countries. Although the tests vary in the specific testing conditions, assessment methods, and criteria desired, there is reasonable convergence between different protocols so that they are likely to lead to similar conclusions for most materials. For aerobic biodegradability, the American Society for Testing and Materials (ASTM) has established ASTM D 5338-92: Test Methods for Determining Aerobic Biodegradation of Plastic Materials Under Controlled Composting Conditions. The test measures the percent of test material that mineralizes as a function of time by monitoring the amount of carbon dioxide being released as a result of assimilation by microorganisms in the presence of active compost held at a thermophilic temperature of 58° C. Carbon dioxide production testing may be conducted via electrolytic respirometry. Other standard protocols, such 301B from the Organization for Economic Cooperation and Development (OECD), may also be used. Standard biodegradation tests in the absence of oxygen are described in various protocols such as ASTM D 5511-94. These tests are used to simulate the biodegradability of materials in an anaerobic solid-waste treatment facility or sanitary landfill.

The films or laminates of the present invention may rapidly biodegrade. Quantitatively, this is defined in terms of percent of material converted to carbon dioxide after a given amount of time. Disintegration may also occur. Disintegration is when the film or laminate has the ability to rapidly fragment and break down into fractions small enough not to be distinguishable after screening when composted or to cause drainpipe clogging when flushed. A disintegratable material may also be flushable. Most protocols for disintegratability measure the weight loss of test materials over time when exposed to various matrices. Both aerobic and anaerobic disintegration tests are used. Weight loss is determined by the amount of test material that is no longer collected on an 18 mesh sieve with 1 millimeter openings after the materials is exposed to wastewater and sludge. For disintegration, the difference in the weight of the initial sample and the dried weight of the sample recovered on a screen will determine the rate and extent of disintegration. The testing for biodegradability and disintegration are similar since essentially the same environment is used for testing. To determine disintegration, the weight of the material remaining is measured, while for biodegradability, the evolved gases are measured.

The films or laminates of the present invention will also be compostable. ASTM has developed test methods and specifications for compostibility. The test measures three characteristics: biodegradability, disintegration, and lack of ecotoxicity. Tests to measure biodegradability and disintegration are described above. To meet the biodegradability criteria for compostability, the material must achieve at least about 60% conversion to carbon dioxide within 40 days. For the disintegration criteria, the material must have less than 10% of the test material remain on a 2 millimeter screen in the actual shape and thickness that it would have in the disposed product. To determine the last criteria, lack of ecotoxicity, the biodegradation byproducts must not exhibit a negative impact on seed germination and plant growth. One test for this criteria is detailed in OECD 208. The International Biodegradable Products Institute will issue a logo for compostability once a product is verified to meet ASTM 6400-99 specifications. The protocol follows Germany's DIN 54900 which determine the maximum thickness of any material that allows complete decomposition within one composting cycle.

The films of the present invention may be thermally bondable. Thermally bondable films are required for the pressurized heat and thru-air heat bonding methods. The films may also be laminated or heat sealed. A lower melting polymer may be desired for heat sealing. Multiple material may be preferred to achieve optimal conditions for heat sealing. Films comprising PHA blended with PLA or laminates comprising a PHA copolymer layer and a PLA polymer or copolymer layer can improve the bonding characteristics of the films.

(3) Method of Film or Laminate Manufacture

The films or laminates of the present invention having increased environmental degradability and/or compostability may be processed using conventional procedures for producing single or multilayer films on conventional film-making equipment. Pellets of the PHA/PLA blends of the present invention can be made by first dry blending and then melt mixing in a film extruder. Alternatively, if insufficient mixing occurs in the film extruder, the pellets can be first dry blended and then melt mixed in a precompounding extruder followed by repelletization prior to film extrusion.

The PHA/PLA blends of the present invention can be melt processed into films using either cast or blown film extrusion methods both of which are described in *Plastics Extrusion Technology*-2nd Ed., by Allan A. Griff (Van Nostrand Reinhold-1976). Cast film is extruded through a linear slot die. Generally the flat web is cooled on a large moving polished metal roll. It quickly cools, and peels off this first roll, passes over one or more auxiliary cooling rolls, then through a set of rubber-coated pull or "haul-off" rolls, and finally to a winder.

In blown film extrusion, the melt is extruded upward through a thin annular die opening. This process is also referred to as tubular film extrusion. Air is introduced through the center of the die to inflate the tube and thereby causing it to expand. A moving bubble is thus formed which is held at a constant size by control of internal air pressure. The tube of film is cooled by air, blown through one or more chill rings surrounding the tube. The tube is then collapsed by drawing it into a flattening frame through a pair of pull rolls and into a winder. For backsheet applications the flattened tubular film is subsequently slit open, unfolded, and further slit into widths appropriate for use in products.

Both cast film and blown film processes can be used to produce either monolayer or multilayer film structures. For the production of monolayer films from a single thermoplastic material or blend of thermoplastic components only a single extruder and single manifold die are required.

For the production of multilayer films or laminates of the present invention, coextrusion processes are preferably employed. Such processes require more than one extruder and either a coextrusion feedblock or multi-manifold die system or combination of the two to achieve the multilayer film structure.

U.S. Pat. Nos. 4,152,387, and 4,197,069, disclose the feedblock principle of coextrusion. Multiple extruders are connected to the feedblock which employs moveable flow dividers to proportionally change the geometry of each individual flow channel in direct relation to the volume of polymer passing through said flow channels. The flow channels are designed such that at their point of confluence, the materials flow together at the same flow rate and pressure eliminating interfacial stress and flow instabilities. Once the materials are joined in the feedblock, they flow into a single manifold die as a composite structure. It is important in such processes that the melt viscosities and melt temperatures of the materials do not differ too greatly; otherwise flow instabilities can result in the die leading to poor control of layer thickness distribution in the multilayer film.

An alternative to feedblock coextrusion is a multi-manifold or vane die as disclosed in aforementioned U.S. Pat. Nos. 4,152,387, 4,197,069, and in U.S. Pat. No. 4,533, 308. Whereas in the feedblock system melt streams are brought together outside and prior to entering the die body, in a multi-manifold or vane die each melt stream has its own manifold in the die where the polymers spread independently in their respective manifolds. The melt streams are married near the die exit with each melt stream at full die width. Moveable vanes provide adjustability of the exit of each flow channel in direct proportion to the volume of material flowing through it, allowing the melts to flow together at the same linear flow rate, pressure, and desired width.

Since the melt flow properties and melt temperatures of the processed materials may vary widely, use of a vane die has several advantages. The die lends itself toward thermal isolation characteristics wherein materials of greatly differing melt temperatures, for example up to 175° F. (80° C.), can be processed together.

Each manifold in a vane die can be designed and tailored to a specific polymer (or copolymer). Thus the flow of each polymer is influenced only by the design of its manifold, and not by forces imposed by other polymers. This allows materials with greatly differing melt viscosities to be coextruded into multilayer films. In addition, the vane die also provides the ability to tailor the width of individual manifolds, such that an internal layer, for example a water soluble biodegradable polymer like Vinex 2034, can be completely surrounded by water insoluble materials leaving no exposed edges susceptible to water. The aforementioned patents also disclose the combined use of feedblock systems and vane dies to achieve more complex multilayer structures.

The multilayer films of the present invention may comprise two or more layers. In general, balanced or symmetrical three-layer and five-layer films are preferred. Balanced three-layer multilayer films comprise a center core layer and two identical outer layers, wherein said center core layer is positioned between said two outer layers. Balanced five-layer multilayer films comprise a center core layer, two identical tie layers, and two identical outer layers, wherein said center core layer is positioned between said two tie layers, and a tie layer is positioned between said center core layer and each outer layer. Balanced films, though not essential to the films of the present invention, are less prone to curling or warping than unbalanced multilayer films.

In three layer films, the center core layer may comprise 30 to 80 percent of the films' total thickness and each outer layer comprises 10 to 35 percent of the films' total thickness. Tie layers, when employed, each comprise from about 5 percent to about 10 percent of the films' total thickness.

Breathable films are fabricated by extensively stretching a film that is loaded with a particulate filler. The stretching may be performed uniformly across the film, for example, as achieved in a tenter framing process such as described by J. H. Briston in *Plastics Films*, 2$^{nd}$ Edition, Longman Inc., New York (1983), pages 83–85. Alternatively, the film can be stretched incrementally across the film, for example, as in ring-rolling operations such as those described in U.S. Pat. Nos. 4,116,892 and 5,296,184 where alternating parallel regions that are stretched coexist with regions that remain virtually unstretched. Stretching the film causes localized mechanical failure of adhesion between the filler particles and the polymer matrix. Such failure creates void structures around the particles, leading to the formation of fine continuous pores across the film. The pore diameter is sufficiently small so as to prevent the penetration of liquid due to a disproportionately large capillary force associated with a very small radius of curvature. Thus, liquid is safely contained by the porous film. The fine continuous pore is capable of passing moisture vapor since the transport of vapor is not hindered by the capillary force. To achieve control of fine pore formation, the filler particles are dispersed uniformly and very finely within the film matrix before the stretching operation. The PHA or PHA/PLA blends of the present invention are expected to have excellent affinity for solid particle surfaces thereby making dispersion straightforward and can be stretched without macroscopic tear.

(4) Disposable Products

The present invention further relates to disposable products comprising a PHA/PLA blend or a laminate of the present invention. For example, compostable absorbent articles comprising a liquid pervious topsheet, a liquid impervious backsheet comprising a film of the present invention (e.g., a film comprising a PHA/PLA blend of the present invention), and an absorbent core positioned between the topsheet and backsheet. Such absorbent articles include infant diapers, adult incontinent briefs and pads, and feminine hygiene pads and liners. Disposable personal care products include breathable products that contain liquid while allowing some passage of moisture vapor.

Additional products comprising a PHA/PLA blend or laminate of the present invention include personal cleansing wipes; disposable health care products such as bandages, wound dressings, wound cleansing pads, surgical gowns, surgical covers, surgical pads; other institutional and health care disposables such as gowns, wipes, pads, bedding items such as sheets and pillowcases, and foam mattress pads.

Films or laminates of the present invention used as liquid impervious backsheets in absorbent articles of the present invention, such as disposable diapers, typically have a thickness of from 0.01 mm to about 0.2 mm, preferably from 0.012 mm to about 0.051 mm.

Other examples of absorbent articles according to the present invention are sanitary napkins designed to receive and contain vaginal discharges such as menses. Disposable sanitary napkins are designed to be held adjacent to the human body through the agency of a garment, such as an undergarment or a panty or by a specially designed belt. Examples of the kinds of sanitary napkins to which the present invention is readily adapted are shown in U.S. Pat. No. 4,687,478, Aug. 18, 1987, and in U.S. Pat. No. 4,589,876, May 20, 1986. It will be apparent that the films of the present invention comprising a PHA/PLA blends or laminates of the present invention described herein may be used as the liquid impervious backsheet of such sanitary napkins. On the other hand it will be understood the present invention is not limited to any specific sanitary napkin configuration or structure.

Importantly, the absorbent articles according to the present invention are biodegradable and/or compostable to a greater extent than conventional absorbent articles which employ materials such as a polyolefin (e.g., a polyethylene backsheet).

EXAMPLE 1

This example is to demonstrate the processing of binary blends comprising a preferred polyhydroxyalkanoate copolymer and a PLA polymer. Specifically, blends containing a polyhydroxyalkanoate copolymer of 3-hydroxybutyrate with about 12 mole percent 3-hydroxylhexanoate (hereafter a PHBH copolymer) and a crystalline poly(lactic acid) (PLA) polymer are melt processed into films using a cast film extrusion method. The level of PHBH is varied from 10 to 70 weight percent based on the total weight of PHBH and PLA. For PHBH levels less than about 35 weight percent, no observable residual tackiness is expected. These PHBH/PLA films, as compared with neat PLA films, are expected to show an appreciable enhancement in softness with the addition of these low-to-moderate levels of PHBH to PLA. For PHBH levels between about 40 and 65 weight percent, some residual tackiness is expected. For PHBH levels greater than about 70 weight percent, substantial residual tackiness is expected.

EXAMPLE 2

This example demonstrates the processing of a ternary blend comprising a preferred polylhydroxyalkanoate copolymer, a PLA polymer, and a preferred moisture sensitive polymer. Specifically, a blend of the PHBH copolymer and the PLA polymer from Example 1, and a polyethylene oxide (PEO) polymer are first prepared by the melt compounding procedure in Example 1, where the PHA level is 20 weight percent, the PLA level is 64 weight percent, and the PEO level is 16 weight percent. The compounded PHBH/PLA/PEO blend is melt processed into films using a cast film extrusion method. These PHBH/PLA/PEO films, as compared with those of the 20/80 and 40/60 PHBH/PLA blends from Example 1, are expected to show an appreciable enhancement in softness with the addition of a small amount of PEO to the PHBH/PLA blends, where the PHA level in the first PHBH/PLA blend is expected to be the same as that in the PHBH/PLA/PEO blend and the PLA level in the second PHBH/PLA blend is expected to be similar to that in the PHBH/PLA/PEO blend.

EXAMPLE 3

This example demonstrates the processing of a bilayer laminate film using the PHA copolymer from Example 1 in a first layer. A PLA resin from Biomer, L5000, is used in a second layer in a first layer-to-second layer ratio of 20/80, 40/60, 60/40 and 80/20. Coextrusion processes are used to produce the bilayer laminate film.

EXAMPLE 4

This example demonstrates the processing of a trilayer laminate film using the PHA copolymer from Example 1 in the outer (first and third) layers or alternatively the middle (second) layer. A PLA resin from Biomer, L5000, is used in the middle (second) layer or outer (first and third) layers in a first layer-to-second layer-to-third layer ratio of 10/80/10, 20/60/20, 30/40/30 and 40/20/40. Coextrusion processes are used to produce the trilayer laminate film.

EXAMPLE 5

This example demonstrates the processing of a trilayer laminate film comprising blended layers using a binary blend of PHA copolymer from Example 1 and a PLA resin from Biomer, L5000, mixed with the ratio of 80/20 in the outer (first and third) layers or alternatively the middle (second) layer. A binary blend of a PLA resin from Biomer, L5000, and PHA copolymer from Example 1 mixed with the ratio of 80/20 is used in the middle (second) layer or outer (first and third) layers in a first layer-to-second layer-to-third layer ratio of 10/80/10, 20/60/20, 30/40/30 and 40/20/40. Coextrusion processes are used to produce the trilayer laminate film comprising blended layers.

EXAMPLE 6

A 100 gram per square meter, 27.5 volume percent calcium carbonated loaded PHBH resin cast film is biaxially oriented and evaluated for water vapor transmission rate. Each sample is stretched 400% in the machine direction and held for 5 seconds. The samples are then stretched 0%, 50%, 100%, 150%, 250%, and 400% in the cross-machine direction. Each sample is held for 5 seconds in the stretched position. The samples will then be tested for water vapor transmission rate. It is expected that films stretched in the machine direction only have relatively low water vapor transition rates. As the amount of stretch in the cross-machine direction is increased, the water vapor transition rate will be increased to values many fold (i.e. 4 to 30 times) greater than the unstretched film.

The disclosures of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the present invention have been illustrated and described, it would be obvious to those skilled in the art in light of the present disclosure that various other changes and modifications can be made without departing from the spirit and scope of the invention. It is intended to cover in the appended claims all such changes and modifications that are within the scope of the invention.

What is claimed is:

1. An environmentally degradable composition comprising:
   a PLA polymer or copolymer; and
   a polyhydroxyalkanoate copolymer comprising at least two randomly repeating monomer units
   wherein a first monomer unit has structure (I)

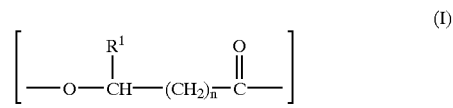

where $R^1$ is H, or C1 or C2 alkyl, n is 1 or 2, but with the proviso that when $R^1$ is a C1 alkyl, n is not 2, and where $R^1$ is a C2 alkyl, n is not 1; and
wherein a second monomer unit has structure (II)

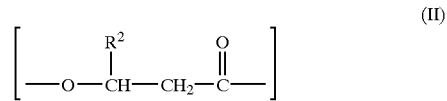

where $R^2$ is a C3–C19 alkyl or C3–C19 alkenyl, or the second monomer unit has structure (III)

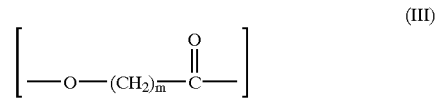

where m is from 2 to 3 or from 5 to 9 wherein the composition is in the form of a film.

2. The composition of claim 1 wherein the polyhydroxyalkanoate copolymer comprises a third randomly repeating monomer having structure (IV):

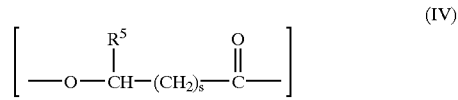

where $R^5$ is H, or C1–C19 alkyl or alkenyl, and s is 1 or 2, with the proviso that the third monomer is not the same as the first or second monomer.

3. The composition of claim 1 further comprising a second polyhydroxyalkanoate polymer or copolymer.

4. The composition of claim 1 wherein the polyhydroxyalkanoate copolymer is present in an amount of from 5% to 95% by weight of the film.

5. The composition of claim 1 wherein the PLA polymer or copolymer is present in an amount of from 5% to 95% by weight of the film.

6. The composition of claim 1 comprising a PLA polymer and wherein the PLA polymer is crystallizable polylactic acid having a melting temperature of from 160° C. to 175° C.

7. A bag comprising the film of claim 1.

8. A wrap comprising the film of claim 1.

9. A multilayer laminate film wherein at least one layer comprises the composition of claim 1.

10. The multilayer laminate film of claim 9 wherein a second layer consists essentially of a PHA copolymer.

11. The multilayer laminate film of claim 9 wherein a second layer consists essentially of a PLA polymer or copolymer.

12. A multilayer laminate film having at least one layer which consists essentially of a PLA polymer or copolymer, and having at least one layer which consists essentially of a polyhydroxyalkanoate copolymer comprising at least two randomly repeating monomer units wherein a first monomer unit has structure (I)

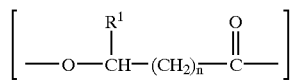

(I)

where $R^1$ is H, or C1 or C2 alkyl, n is 1 or 2, but with the proviso that when $R^1$ is a C1 alkyl, n is not 2, and where $R^1$ is a C2 alkyl, n is not 1; and wherein a second monomer unit has structure (II)

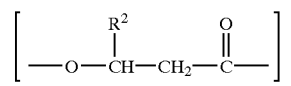

(II)

where $R^2$ is a C3–C19 alkyl or C3–C19 alkenyl, or the second monomer unit has structure (III)

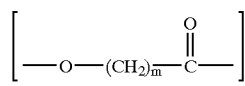

(III)

where m is from 2 to 3 or from 5 to 9.

13. The environmentally degradable composition of claim 1 further comprising dispersed particulate filler, the composition in the form of a stretched film having continuous pores that prevent penetration of liquid and that pass moisture vapor.

14. The multilayer laminate of claim 9 wherein the at least one layer further comprises dispersed particulate filler, the layer having been stretched to produce continuous pores that prevent penetration of liquid and that pass moisture vapor.

15. An environmentally degradable breathable film comprising:

a polyhydroxyalkanoate copolymer comprising at least two randomly repeating monomer units wherein a first monomer unit has structure (I)

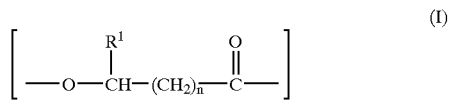

(I)

where $R^1$ is H, or C1 or C2 alkyl, n is 1 or 2, but not the proviso that when $R^1$ is a C1 alkyl, n is not 2, and where $R^1$ is a C2 alkyl, n is not 1; and wherein a second monomer unit has structure (II)

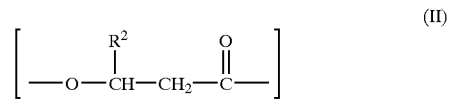

(II)

where $R^2$ is a C3–C19 alkyl or C3–C19 alkenyl, or the second monomer unit has structure (III)

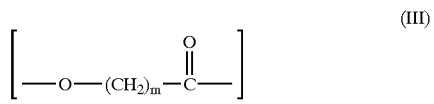

(III)

where m is from 2 to 3 or 5 to 9.

* * * * *

UNITED STATES PATENT AND TRADEMARK OFFICE
CERTIFICATE OF CORRECTION

PATENT NO.   : 6,808,795 B2
DATED        : October 26, 2004
INVENTOR(S)  : Noda et al.

It is certified that error appears in the above-identified patent and that said Letters Patent is hereby corrected as shown below:

Column 6,
Line 61, delete "theological" and insert -- rheological --.

Column 14,
Line 51, delete "3-hydroxylhexanoate" and insert -- 3-hydroxyhexanoate --.
Line 67, delete "polylhydroxyalkanoate" and insert -- polyhydroxyalkanoate --.

Column 18,
Line 24, delete "not" and insert -- with --.
Line 44, after "or", and insert -- from --.

Signed and Sealed this

Nineteenth Day of April, 2005

JON W. DUDAS
*Director of the United States Patent and Trademark Office*